United States Patent Office 3,428,605
Patented Feb. 18, 1969

3,428,605
STABILIZATION OF OXYMETHYLENE COPOLYMERS
Eldred T. Smith, Corpus Christi, Tex., and Walter E. Heinz, Frankfurt am Main, Germany, assignors to Celanese Corporation, a corporation of Delaware
No Drawing. Filed Sept. 30, 1964, Ser. No. 400,585
U.S. Cl. 260—67
Int. Cl. C08f 3/40
2 Claims

ABSTRACT OF THE DISCLOSURE

Disclosed herein is a process for stabilizing oxymethylene polymers. The polymers are stabilized through the use of hydrolysis. The improvement disclosed herein comprises the use of a trioxane containing hydrolysis medium.

---

This invention relates to stabilized polymers and, more particularly, to polymers which are comparatively stable against degradation but which are derived from polymers which have a higher susceptibility to such degradation. The invention also relates to method of stabilizing such polymers.

Certain polymers are comprised of comparatively stable and comparatively unstable monomeric units and many times the resistance of such polymers to degradation depends upon the relative location of the aforementioned stable and unstable monomeric units. For example, if a polymer is susceptible to degradation by a mechanism which attacks the ends of the polymer molecules it can be seen that if the ends of the molecules are susceptible to degradation, the polymer will have less stability than if the molecule ends are relatively stable to degradation.

While the subject invention will be described with reference to oxymethylene copolymers it should not be limited thereto as the principles of the invention are applicable to other polymers having appropriate stable and unstable units.

In general, the invention involves the stabilization of a polymer having stable and unstable units in its molecules by treating the polymer in such a way as to selectively degrade the polymer and remove unstable units from its molecules.

In a preferred embodiment of this invention there is provided a method of stabilizing a copolymer against thermal degradation wherein the unstabilized polymer is susceptible to such degradation inasmuch as it contains monomeric units of comparatively high susceptibility to thermal degradation which are interspersed with other monomeric units which are comparatively stable to thermal degradation. The invention comprises subjecting the polymer to a treatment to degrade the end portions of the molecules of the polymer which are made up of the comparatively susceptible monomeric units thereby leaving a residual polymer having the comparatively stable monomeric units in terminal portions of its molecules. In one embodiment of this invention at least 50 and preferably at least 80% of the polymeric chains of the molecules of the treated polymer have comparatively stable, or comparatively thermal-resistant, units in terminal positions.

In a preferred embodiment the invention involves accomplishing the terminal degradation of the polymer molecules by a hydrolysis reaction as discussed further below wherein the hydrolysis medium contains between about 50 and about 99 weight percent of trioxane and wherein the polymer is dissolved in the trioxane-containing medium during the hydrolysis reaction.

Oxymethylene polymers, having recurring —OCH$_2$— units directly attached to each other, have been known for many years. They may be prepared by the polymerization of anhydrous formaldehyde or by the polymerization of trioxane, which is a cyclic trimer of formaldehyde. High molecular weight oxymethylene polymers vary in thermal stability and, in accordance with a preferred embodiment of this invention, the polymer which is stabilized is an oxymethylene polymer containing carbon-to-carbon single bonds in the main polymer chain.

In a particularly preferred embodiment of our invention the polymeric compounds to be treated are oxymethylene copolymers having at least one chain containing recurring oxymethylene units interspersed with —OR— groups in the main polymer chain, where R is a divalent radical containing at least two carbon atoms directly linked to each other and positioned in the polymer chain between the two valences, with any substituents on said R radical being inert, that is, those which are free of interfering functional groups and will not induce undesirable reactions. In a preferred embodiment the polymers have a chain containing between about 85 to 99.6 mol percent of the oxymethylene units interspersed with between about 0.4 and about 15 mol percent of the —O—R units. The preferred copolymers are those containing oxymethylene and oxyethylene groups, such as copolymers of trioxane with dioxolane or with ethylene oxide. In a preferred embodiment R may be, for example, an alkylene or substituted alkylene group containing at least two carbon atoms.

Among the copolymers which may be utilized in accordance with this aspect of the invention are those having a structure comprising recurring units having the formula

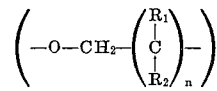

wherein $n$ is an integer from zero to 5 and wherein $n$ is zero in from 60 to 99.6 percent of the recurring units. $R_1$ and $R_2$ are inert substituents, that is, substituents which are free of interfering functional groups and will not induce undesirable reactions.

A preferred class of copolymers are those having a structure comprising oxymethylene and oxyethylene recurring units wherein from 60 to 99.6 percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing trioxane or formaldehyde with a cyclic ether having the structure

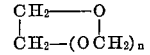

where $n$ is an integer from zero to 2.

Examples of preferred polymers include copolymers of trioxane and cyclic ethers containing at least two adjacent carbon atoms such as the copolymers disclosed in U.S. Patent No. 3,027,352, by Cheves T. Walling, Frank Brown and Kenneth W. Bartz, which patent is assigned to the same assignee as the subject application.

Among the specific cyclic ethers which may be used are ethylene oxide; 1,3-dioxolane; 1,3,5-trioxepane; 1,3-dioxane; trimethylene oxide; pentamethylene oxide; 1,2-propylene oxide; 1,2-butylene oxide; neopentyl formal; paraldehyde; tetrahydrofuran and butadiene monoxide.

Other oxymethylene polymers and methods of preparation therefor are disclosed by Kern et al. in Angewandte Chemi 73(6) 177–186 (Mar. 21, 1961) including polymers containing repeating carbon-to-carbon single bonds in the polymer chain by copolymerizing trioxane with cyclic ethers such as dioxane, lactones such as beta-propiolactone, anhydrides such as cyclic adipic anhydride and ethylenically unsaturated compounds such as styrene, vinyl acetate, vinyl methyl ketone, acrolein, etc. These and other polymers are disclosed by Sittig in "Polyacetals—What You Should Know," Petroleum Refiner 41(11), p. 131–170, November 1962.

As used in the specification and claims of the subject application, the term "oxymethylene" includes substituted oxymethylene, where the substituents are inert with respect to the reactions in question, that is, the substituents are free of interfering functional groups and will not introduce undesirable reactions.

As used in the specification and claims of this application, the term "copolymer" means polymers having two or more monomeric groups, including terpolymers and higher polymers. Suitable terpolymers include those disclosed in U.S. patent application Ser. No. 229,715, filed Oct. 10, 1962, by W. E. Heinz and F. B. McAndrew, which is assigned to the same assignee as the subject application.

The preferred polymers which are treated in this invention are thermoplastic materials having a melting point of at least 150° C. and are normally millable at a temperature of 200° C. They have a number average molecular weight of at least 10,000. These polymers are suitable for making molded articles, films, sheets, fibers, pipes, etc.

These polymers have a high thermal stability before treatment in accordance with this invention but this stability is markedly improved by such treatment. For example if a sample of the polymer which has been treated in accordance with this invention, and which has also been chemically stabilized as described below, is placed in an open vessel in a circulating air oven at a temperature of 230° C. and its weight loss is measured without removal of the sample from the oven, it will have a thermal degradation rate of less than 1.0 wt. percent/min. for the first 45 minutes and, in preferred instances, less than 0.1 wt. percent/min. for the same period of time.

The preferred polymers which are treated in this invention have an inherent viscosity of at least one (measured at 60° C. in an 0.1 weight percent solution in p-chlorophenol containing 2 weight percent of α-pinene). After treatment the preferred copolymers exhibit remarkable alkaline stability. For example, if the treated copolymers are refluxed at a temperature of about 142°–145° C. in a 50% solution of sodium hydroxide in water for a period of 45 minutes, the weight of the copolymer will be reduced by less than one percent.

Any of the known catalysts suitable for the polymerization of trioxane itself or with other materials may be used to make suitable copolymers.

Preferred catalysts are cationic catalysts including such inorganic fluorine-containing catalyst as boron trifluoride, antimony trifluoride, antimony fluoroborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorous pentafluoride, hydrogen fluoride and compounds containing these materials such as boron fluoride coordinate complexes with organic compounds, particularly those in which oxygen or sulfur is the donor atom.

Other suitable catalysts include thionyl chloride, fluorosulfonic acid, methane sulfonic acid, phosphorous trichloride, titanium tetrachloride, ferric chloride, zirconium tetrachloride, aluminum trichloride, stannic chloride and stannous chloride.

The particularly preferred catalysts are boron fluoride and boron fluoride-containing materials such as boron fluoride monohydrate, boron fluoride dihydrate and boron fluoride trihydrate as well as the previously mentioned boron fluoride coordinate complexes with organic compounds.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is a preferred coordinate complex. The boron fluoride complex with diethyl ether is also very effective. Other boron fluoride complexes which may be used are the complexes with methyl acetate, with ethyl acetate, with phenyl acetate, with dimethyl ether, with methyl phenyl ether and with dimethyl sulfide. Suitable catalysts are disclosed in U.S. Patents 2,939,505; 2,989,506; 2,989,507; 2,989,508; 2,989,509; all of which are by Donald E. Hudgin and Frank M. Berardinelli; 2,989,510 by George J. Bruni; and 2,989,511 by Arthur W. Schnizer. All of the above patents are assigned to the same assignee as the subject application.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture such as may be present in the commercial grade reactants or may be introduced by contact with atmospheric air, will not prevent polymerization, but should be removed for best yields.

In preparing the preferred copolymers, the trioxane, cyclic ether and catalyst are dissolved in a common anhydrous solvent such as cyclohexane, and permitted to react in a reaction zone. The temperature in the reaction zone may vary from about 0° C. to about 120° C. The period of reaction may vary from about 5 minutes to about 72 hours. Pressures from subatmospheric to about 100 atmospheres, or more may be used, although atmospheric pressure is preferred.

The chemical constitution of the cyclic ether must be considered. Thus, 1,3-dioxolane contains both an oxymethylene group and an oxyethylene group. Its incorporation into the copolymer molecule increases both the oxymethylene and the oxyethylene content of the polymer molecule.

In general, the cyclic ether is present in the reaction mixture in amounts between about 0.2 and about 30 mol percent, based on the total mols of monomer. The optimum proportion will depend on the particular copolymer desired, the expected degree of conversion and the chemical constitution of the cyclic ether used.

The copolymers produced from the preferred cyclic ethers have a structure substantially composed of oxymethylene and oxyethylene groups in a ratio from about 250:1 to about 1.5:1.

Upon completion of the polymerization reaction it is desirable to neutralize the activity of the polymerization catalyst since prolonged contact with the catalyst degrades the polymer. The polymerization product may be treated with an aliphatic amine, such as tri-n-butylamine or triethylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of suitable methods of neutralizing catalyst activity may be found in U.S. Patent No. 2,989,509 by Donald E. Hudgin and Frank M. Berardinelli, assigned to the same assignee as the subject application.

By the use of techniques which are conducive to the production of polymers of high molecular weight and by the incorporation of comonomers, as described above, it has been possible to produce polymers having oxymethylene groups directly attached to each other which are relatively stable against thermal degradation. By further incorporation of chemical stabilizers, as described below, it has been possible to stabilize oxymethylene polymers so that their degradation rate is less than about 0.1 weight percent per minute for most of the polymer mass when the polymer is maintained in an open vessel in a circulating air oven at 230° C. However, despite this high stability for most of the polymer mass, it has been difficult to reduce the initial degradation rate of the polymer (at 230° C. in air) to a satisfactory level. It has been found that a polymer may be reduced to a degradation rate (at 230° C. in air) for most of its mass of less than 0.1 weight percent per minute while the initial 0.5 to 20 weight percent of the polymer has a higher degradation rate (at 230° C. in air) of the order of between 1 and 0.5 weight percent per minute. For the purpose of convenience the degradation rate (at 230° C. in air) for most of the polymer mass is hereinafter designated as the "base" degradation rate.

During molding processes, oxymethylene polymers are generally heated to temperatures between about 180° and about 230° C. for relatively short periods between about 5 seconds and about 5 minutes. Even where the base degradation rate (at 230° C. in air) has been reduced to below 0.1 weight percent per minute, it has been found that molded products have uneven surface characteristics, due to gassing, unless the initial degradation rate is also reduced to below 0.1 weight percent per minute.

In accordance with one aspect of the invention, a polymer containing comparatively stable and comparatively unstable portions is subjected to treatment with a reactant to selectively degrade the polymer and remove unstable portions from its molecules while the polymer is in solution in a liquid hydrolysis medium containing trioxane. Preferably the liquid medium contains between about 50 and about 99 weight percent of trioxane, based on the weight of the liquid medium. The remainder of the liquid medium includes the hydrolysis reactants and in general, the hydrolysis reactants preferably comprise between about 1 and about 50 weight percent of water, based on the total weight of the liquid medium. It should be clearly understood that the weight percentages of the liquid medium do not include the weight of polymer dissolved therein.

The hydrolysis reactants may also comprise between 0 and about 50 weight percent of a water soluble, normally liquid, non-acidic organic compound having an oxygen atom directly bonded to a carbon atom where the oxygen atom is a hydroxy oxygen atom. The water and/or the hydroxy oxygen containing material should be present in a total weight amount between about 1 and about 50 weight percent based on the weight of the solvent medium. Between about 0 and about 100 weight percent of the hydroxy oxygen containing material may be replaced with another water soluble, normally liquid, non-acidic organic compound which has an oxygen atom directly bonded to a carbon atom where the oxygen atom is an etheric oxygen atom or a non-terminal carbonyl atom which is either a ketone oxygen atom or an ester oxygen atom.

While the solvent should contain water or hydroxy compounds they should not be present in amounts great enough to cause the polymer to remain undissolved at the temperature of the hydrolysis reaction. Thus it can be seen that the temperature of the hydrolysis reaction is related to the amount of water which can be used. It is preferred that the solvent form only a single phase at the reaction temperature, although two phases may form when the solution is cooled to precipitate the polymer.

The organic hydroxy containing material may, for example, be an alcohol. Suitable alcohols include aliphatic alcohols and preferably those containing from 1 to 20 carbon atoms including methyl alcohol, ethyl alcohol, n-propyl alcohol, isopropyl alcohol, n-butyl alcohol, iso-butyl alcohol, sec-butyl alcohol, tert-butyl alcohol, the amyl alcohols, the hexyl alcohols, octyl alcohols including capryl alcohol, decyl alcohol, lauryl alcohol, myristyl alcohol, cetyl alcohol, stearyl alcohol, beta-methoxyethyl alcohol, etc. Other suitable alcohols include the aromatic alcohols, preferably those having 1 to 20 carbon atoms, including benzyl alcohol, alpha-phenylethyl alcohol, beta-phenylethyl alcohol, o-methylbenzyl alcohol, diphenyl-carbinol, triphenyl carbinol, o-ethylbenzyl alcohol, p-propylbenzyl alcohol, 2-methylolbenzyl alcohol, 3-ethylolbenzyl alcohol, 3-methylolalpha-phenylethyl alcohol, etc.

Other suitable alcohols include cycloaliphatic alcohols, preferably those having from 1 to 20 carbon atoms including cyclopentyl carbonyl dicyclohexyl-1,1'-diol, 1,2-dimethylcyclopentane - 1,2 - diol, cyclopentyl alcohol, 1,2-dimethylcyclopentyl alcohol, 1-methylcyclohexyl alcohol, 3-methylcyclohexyl alcohol, 2-propylcyclopentyl alcohol, 2,2-dimethylcyclopentyl alcohol, cyclopentylethyl methylol, cyclohexylethyl methylol, etc.

Other suitable alcohols include the polyhydric alcohols, some of which have been mentioned above, preferably those containing from 1 to 20 carbon atoms, such as ethylene glycol, glycerol, diethylene glycol, pentamethylene glycol, propylene glycol, trimethylene 1,2-butanediol, 1,3-butanediol, 1,4-butanediol, hexamethylene glycol, trimethylolpropane, trimethylolethane, quercitol, inositol, 1,8-octanediol, 1,3,7-octanetriol, etc.

The organic materials containing a ketone oxygen atom preferably contain from 2 to about 20 carbon atoms and may include acetone, methylethyl ketone, methyl n-propyl ketone, methyl isopropyl ketone, diethyl ketone, hexanone-2, hexanone-3, acetylacetone, acetonylacetone, di-n-propyl ketone, etc.

Suitable ester oxygen containing materials preferably contain from 2 to about 20 carbon atoms and may include ethyl acetate, n-propyl acetate, isopropyl acetate, n-butyl acetate, sec-butyl acetate, tert-butyl acetate, isobutyl acetate, ethyl propionate, ethyl n-butyrate, methyl isobutyrate, n-propyl valearate, ethyl caproate, ethyl laurate, n-propyl palmitate, ethyl stearate, etc.

Suitable etheric oxygen containing materials preferably contain from 2 to about 20 carbon atoms and may include dimethyl ether, diethyl ether, di-n-propyl ether, di-isopropyl ether, di-n-amyl ether, methylethyl ether, methyl n-propyl ether, methyl isopropyl ether, ethyl n-propyl ether, ethyl isopropyl ether, methylal, m-dioxane, p-dioxane, etc.

The temperature of the hydrolysis treatment must be above the solution temperature of the polymer in the solvent and is suitably between about 100° C. and about 250° C. At higher temperatures within this range the hydrolysis treatment is conducted under sufficient pressure to maintain the solution in liquid phase. The normally preferred temperature range is between about 150 and 180° C.

In one advantageous method of operation, the polymerization product may be quenched with a quenching medium which is also suitable as a hydrolysis medium. For example, a polymerization product removed from a polymerization zone at a temperature between about 60° and about 116° C. may be quenched with from about 5 to 50 times its weight of a water-trioxane mixture containing from about 50 to about 70 weight percent of trioxane, based on the weight of the mixture. The mixture of polymerization product and quench medium is wet ground to break up the larger particles of polymer and the slurry (having from about 2 to about 20 weight percent of solids) is suitable for hydrolysis. From about 10 to about 1000 p.p.m. of ammonia (based on the weight of solid polymer) is added and the slurry is passed through a double pipe exchanger wherein it reaches a temperature between about 110° C. and 180° C. and between about 15 to about 100 p.s.i.g. Under these conditions, the polymer dissolves in the slurry medium. The residence time in the pipe exchanger is between about 30 and about 160 seconds. Water is then added in a mixing T to reduce the temperature to between about 30° and about 95° C. to precipitate the polymer.

The use of a solvent medium comprising a major amount of trioxane and no more than a minor amount of another organic compound, has marked economic advantages due to the elimination of facilities, such as distillation columns, which would be necessary for the recovery of such another organic compound. Also the polymer flake formed is more easily handled when such a solvent is used.

The terminal units of the oxymethylene polymer are often hydroxy-substituted oxymethylene $$(-O-CH_2-OH)$$

units and detachment of an oxymethylene group from the polymer molecule by the hydrolysis reaction has the effect of shifting the hydrogen atoms of the hydroxyl group to the oxygen atom of the next adjacent oxymethylene group.

When oxyethylene units, for example, are incorporated in the polymer chain by copolymerization as described above, the successive detachment of oxymethylene units takes place until an oxyethylene unit becomes the terminal units of the chain. The oxyethylene units, having carbon-to-carbon bonds therein, are comparatively resistant to such detachment, and remain attached to the polymeric chain in the terminal position and protect the internal oxymethylene units from further hydrolytic removal. Since oxyethylene units are also resistant to detachment by heat, the degraded molecule has a better initial thermal stability than the original copolymer from which it was derived.

During the hydrolysis reaction a portion of the copolymer is decomposed to formaldehyde resulting in a weight loss of copolymer. It is believed that the formaldehyde is formed by the successive detachment of the terminal oxymethylene units from the ends of the polymer chain. The hydrolytic degradation of unstable groups is complete when the weight loss substantially ceases.

It has been found that the products of the selective treatment of this invention, after substantially constant weight is achieved, are also extremely stable against attack by the reaction conditions. The treatment produces a weight loss at a first, comparatively high, rate, which, after the treatment continues for a suitable period of time, drops to a rate of less than 20% of the first rate loss, and, most preferably, between 0.1% and 5% of the first rate loss. Thus, in a preferred embodiment, the polymer is subjected to the reaction conditions until it achieves substantially constant weight. Thus, an oxymethylene copolymer having had the hydrolytic treatment, is not only thermally stable but is also extremely stable against such further hydrolytic treatment event at conditions more severe than those of the treatment and despite the fact that the polymer still has a substantial content of internal oxymethylene units which are normally subject to degradation by alkaline hydrolysis unless protected by suitable end groups which are resistant to degradation under such conditions.

In a preferred embodiment of this invention the dissolved polymer is subjected to the hydrolysis under non-acidic, preferably alkaline, conditions where the pH is at least 7. The alkaline material is preferably water soluble, or soluble in the organic solvent material, and may be a strongly basic hydroxide such as the hydroxide of an alkali metal, or alkaline earth metal, or it may be the salt of a strong base and weak acid, or it may be ammonia or an organic base, such as an amine or an amidine.

Suitable alkaline materials include ammonium hydroxide, sodium hydroxide, potassium hydroxide, sodium carbonate, sodium acetate, hexamine, triethanolamine, tripropylamine, trimethylguanidine, trimethylamine, tributylamine, etc.

In a preferred embodiment the amount of alkaline material present in the chemical reaction is from 0.001 weight percent to about 10.0 weight percent, most preferably between about 0.001 weight percent and about 1.0 weight percent. When no alkaline material is used it may be desirable to have the reaction take place in a buffered system since some of the products of the hydrolysis are acidic and would thereupon cause the system to become acidic which might have deleterious effects on the polymer.

In addition alkaline hydrolysis is preferable over neutral hydrolysis since it is faster and since the alkaline material will neutralize any excess polymerization catalyst which might otherwise tend to degrade the polymer during the hydrolysis step.

The solvent medium is suitably used in amounts between about 1 and about 50 pounds per pound of copolymer and preferably between about 3 and about 20 pounds per pound of copolymer.

The hydrolysis reaction may take from about 15 seconds to about 1 hour with from about 1 to 2 minutes being preferred.

In general the hydrolysis reaction should continue and should selectively remove the comparatively thermally unstable terminal units until at least one of the following events occurs.

(1) The weight loss rate of the treated polymer is below 0.1 weight percent per minute.

(2) At least 95% of the polymer molecules which were terminated by the comparatively thermally unstable terminal units, are terminated by comparatively stable units having carbon-to-carbon bonds derived from the —O—R— units.

(3) A disc of the treated polymer having a thickness of 50 mils will lose no more than about 1% of its weight in ½ hour when subjected to 50 weight percent sodium hydroxide at 145° C.

(4) The weight loss rate drops to between about 0.1 and about 5% of the first initial weight loss rate. The above weight loss rates are stated in terms of weight lost per minute when the polymer is maintained in an open vessel in a circulating air oven at 230° C.

The hydrolysis process is further described in U.S. patent application Ser. No. 102,096, filed Apr. 11, 1961, by Wall, Smith and Fisher and in U.S. patent application Ser. No. 372,390, filed June 3, 1964, by Berardinelli. These applications are assigned to the same assignee as the subject application.

In a preferred embodiment of this invention it is generally desirable to incorporate one or more thermal stabilizers into the copolymer in order to bring its thermal degradation even lower. The proportion of stabilizer incorporated depends upon the specific stabilizer used. A proportion between about 0.05 and 10 weight percent (based on the weight of the polymer) has been found to be suitable for most stabilizers.

One suitable stabilizer system is a combination of (1) an antioxidant ingredient, such as phenolic antioxidant and most suitably a substituted bisphenol, and (2) an ingredient to inhibit chain scisson, generally a compound or a polymer containing trivalent nitrogen atoms.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(4-methyl-6-tertiary butyl phenol) and 4,4'-butylidene bis-(6-tertiary butyl - 3 - methyl phenol). Suitable phenolic stabilizers other than alkylene bisphenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrollidone, hydrazides, compounds having 1 to 6 amide groups, proteins, compounds having tertiary amine and terminal amide groups, compounds having amidine groups, cycloaliphatic amine compounds and aliphatic acylureas. Other suitable stabilizers are described in the above mentioned Kern et al. and Sittig articles and in the references cited therein.

The stabilizers may be incorporated into the polymer by dissolving both the polymer and the stabilizer in a common solvent and thereafter evaporating the solution to dryness. Alternatively, the stabilizers may be incorporated into the polymer by applying a solution of the stabilizer to finely divided polymer, as in a slurry, and thereafter filtering the polymer and evaporating to dryness. The stabilizer, in finely divided dry state may be blended into finely divided polymer in any suitable blending apparatus.

One suitable method of incorporation of the chemical stabilizers is by blending a dry solid stabilizer into the plastic polymer, while the latter is being kneaded as on heated rolls or through an extruder.

EXAMPLE I

A mixture of 99.5 parts by weight of trioxane, 2.0 parts of ethylene oxide, 2.5 parts of cyclohexane and 0.0053 p.p.m. of boron trifluoride (as the di-n-butyl etherate complex) were fed to one end of an elongated continuous mixer. The temperature in the mixer rose to a maximum of 75 to 85° C. at the discharge point. The copolymer was quenched in a methanol-water solution (60-40 ratio by weight), washed with acetone and dried.

A solvent was prepared by mixing 70 parts by weight of trioxane, 30 parts by weight of water and 0.05 part by weight of ammonia. A mixture of 70 parts of this solvent and 30 parts of the discharged polymer described above was added to a closed rocking autoclave and heated rapidly to 160° C. The autoclave was then removed from the rocker and its contents rapidly cooled to ambient temperatures by immersion in a water bath. The precipitated polymer was removed from the autoclave, washed twice with water and once with acetone, and dried. The dried polymer was then mixed at 210° C. for seven minutes in a Brabender Plastograph with 0.5 wt. percent of 2,2'-methylene bis (4-methyl-6-tertiarybutyl phenol) and 0.1 wt. percent of cyanoguanidine based on the weight of the polymer.

The average thermal degradation rate of the stabilized polymer, when heated for 45 minutes at 230° C. in an open vessel in an oven, was 0.008 wt. percent per minute.

EXAMPLE II

A mixture of 97 parts by weight of trioxane, two parts by weight of ethylene oxide, 1 part by weight of cyclohexane, 0.006 part methylal, and 0.0085 part of boron trifluoride (charged as the dibutyl etherate) were fed to cone end of an elongated continuous mixer. The residence time in the mixer was about 3 minutes. The material was quenched, washed and dried.

A stirred pressure vessel was charged with a mixture of 10 parts by weight of copolymer, 90 parts by weight of a trioxane-water solution having a 50/50 weight ratio, and 0.1% of ammonia. The mixture was heated to 180°–185° C. in a period of 40–50 minutes during which the pressure rose to 200 p.s.i.g. On reaching 185° C., the mixture was pressured over through a heated line into a precipitation vessel containing an equal volume of water at room temperature. The precipitated polymer was filtered, washed with water four times and dried to constant weight at 145° C. under nitrogen in an oven.

After being stabilized with 2,2'-methylene bis (4-methyl-6-tertiarybutyl phenol) and cyanoguanidine as described in Example I, the polymer had an average thermal degradation rate of 0.012 wt. percent per minute.

In addition to oxymethylene copolymers containing unstable end portions and stable portions as part of the same molecule, e.g. as is the case with copolymers of trioxane and cyclic ethers containing adjacent carbon atoms, the process of this invention is also suitable for the treatment of polymers made up of a mixture of stable and unstable whole molecules, e.g. such as occurs when an oxymethylene homopolymer mass is treated to "cap" only a portion of the ends of the molecules with such stable groups as ether groups, e.g., methoxy groups. In this case, the mass of polymer is made up of stable molecules having both ends capped with such stable groups, and unstable molecules with at least one end remaining uncapped or capped with a comparatively unstable end group such as an acetate end group. The treatment will thus result in the complete degradation of the unstable molecules leaving a residue of stable molecules.

It is to be understood that the foregoing detailed description is given merely by way of illustration and that many variations may be made therein without departing from the spirit of our invention.

The embodiments of the invention in which an exclusive property or privilege is claimed are defined as follows:

1. In the process for the stabilization of a moldable oxymethylene polymer having at least one chain containing
   (A) from about 85 to 99.9 mol percent of oxymethylene units interspersed with
   (B) from about 0.1 to about 15 mol percent of —O—R— units wherein R is a divalent radical containing at least two carbon atoms directly linked to each other and positioned in the chain between the two valences with any substituents in said R radical being inert,
at least part of the terminal units of the molecules of said polymer being comparatively thermally unstable hydroxy-substituted oxymethylene units of higher susceptibility to thermal degradation than terminal units derived from said —O—R— units,
   said process comprising selectively removing said comparatively thermally unstable terminal units in the presence of a hydrolysis solvent medium,
   said hydrolysis medium comprising
      (1) between about 1 and about 50 weight percent of water, based on the weight of the hydrolysis solvent medium and
      (2) between 0 and about 50 weight percent of a water soluble, normally liquid, non-acidic organic compound having an oxygen atom directly bonded to a carbon atom, said oxygen atom being selected from the group consisting of
         (a) hydroxy oxygen atoms,
         (b) etheric oxygen atoms and
         (c) non-terminal carbonyl oxygen atoms selected from the group consisting of ketone oxygen atoms and ester oxygen atoms,
   the material of (1) and (2) (a) being present in a total amount between about 1 and about 50 percent by weight,
   the improvement wherein said hydrolysis solvent medium contains between about 50 and about 99 weight percent of trioxane and wherein said polymer is dissolved in said trioxane-containing hydrolysis medium during said reaction in a weight percent ratio of from 1:1 to about 1:50 of polymer to trioxane containing hydrolysis medium.

2. The process of claim 1 wherein said hydrolysis reaction is carried out at a temperature between about 100° C. and about 250° C.

References Cited

UNITED STATES PATENTS

| | | | |
|---|---|---|---|
| 3,174,948 | 4/1965 | Wall et al. | 260—67 |
| 3,219,623 | 11/1965 | Berardinelli. | |
| 3,318,848 | 5/1967 | Clarke | 260—67 |

WILLIAM H. SHORT, *Primary Examiner.*

L. M. PHYNES, *Assistant Examiner.*